United States Patent
Veeraswamy et al.

(10) Patent No.: US 8,904,229 B1
(45) Date of Patent: Dec. 2, 2014

(54) ONLINE RECOVERY OF A FILE SYSTEM EXPERIENCING FAILURE OF REDUNDANT LOGICAL STORAGE STORING A SINGLE POINT OF FAILURE

(75) Inventors: Sairam Veeraswamy, South Grafton, MA (US); Rolland Santimano, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 235 days.

(21) Appl. No.: 13/538,113

(22) Filed: Jun. 29, 2012

(51) Int. Cl.
*G06F 11/00* (2006.01)

(52) U.S. Cl.
USPC .............................. 714/6.2; 714/6.22; 714/6.3

(58) Field of Classification Search
USPC .......................... 714/6.2, 6.22, 6.3
See application file for complete search history.

(56) References Cited

U.S. PATENT DOCUMENTS

| | | | |
|---|---|---|---|
| 6,678,788 B1 | 1/2004 | O'Connell | |
| 6,691,209 B1 | 2/2004 | O'Connell | |
| 6,865,157 B1 | 3/2005 | Scott et al. | |
| 7,219,260 B1 | 5/2007 | de Forest et al. | |
| 7,627,779 B2 | 12/2009 | Fair | |
| 7,694,191 B1 | 4/2010 | Bono et al. | |
| 7,730,090 B2 | 6/2010 | Godbole | |
| 7,809,975 B2 | 10/2010 | French et al. | |
| 7,818,302 B2 | 10/2010 | Godbole | |
| 7,849,350 B2 | 12/2010 | French et al. | |
| 7,870,356 B1 | 1/2011 | Veeraswamy et al. | |
| 7,900,088 B1 | 3/2011 | Pawar et al. | |
| 8,078,905 B1 * | 12/2011 | Vipul et al. | 714/6.1 |
| 8,086,893 B1 * | 12/2011 | MacFarland et al. | 714/3 |
| 8,145,947 B1 | 3/2012 | Hayden et al. | |
| 8,595,547 B1 * | 11/2013 | Sivasubramanian et al. | 714/6.23 |
| 2005/0204108 A1 | 9/2005 | Ofek et al. | |
| 2011/0078118 A1 | 3/2011 | Kushwah | |
| 2012/0005379 A1 | 1/2012 | Dutch et al. | |

\* cited by examiner

*Primary Examiner* — Joshua P Lottich
(74) *Attorney, Agent, or Firm* — BainwoodHuang

(57) ABSTRACT

A storage processor includes storage for redundantly storing a log file of a journaling file system on a separate logical device from a primary copy of the log file and further provides for recovery of the file system upon failure of both the primary storage and the redundant storage storing the log file of the journaling file system by storing dirtied metadata objects in the cache of the storage processor to a vault area and then applying the stored dirtied metadata objects against the underlying persistent storage.

21 Claims, 5 Drawing Sheets

US 8,904,229 B1

ONLINE RECOVERY OF A FILE SYSTEM EXPERIENCING FAILURE OF REDUNDANT LOGICAL STORAGE STORING A SINGLE POINT OF FAILURE

BACKGROUND

In the conventional art, a journaling file system is a file system that keeps track of the changes that will be applied from a cache to storage in a log file in a dedicated area of the file system before committing the changes to a persistent disk.

The log file records the changes it will make to metadata of the file system prior to the changes actually being stored persistently. In the event of a file system crash the file system can be remounted and processing begins again by reading the log file and replaying changes from the log file until the file system is in a consistent state.

As the log file is central to all updates that are applied to the file system, the log file is a single point of failure. To secure the log file and provide protection against and ensure the integrity of a single point of failure, the log file is placed within a slice of a logical persistent storage device that is stored on a storage device group which provides redundant physical storage devices for each logical persistent storage device. In this manner, if a physical storage device storing the slice with the log file fails the data still exists on one of the redundant physical storage devices in the storage device group.

SUMMARY

Unfortunately, there are deficiencies with the above-described conventional file system with the log file stored on redundant physical storage devices for a logical persistent storage device. In particular, even with redundant physical storage devices storing the log file, the log file may be lost.

In contrast to the above-described conventional journaling file system in which the log file can be lost on physically redundant storage devices, an improved technique redundantly stores the log file on multiple logical devices. The techniques further provide for recovery of the journaling file system upon failure of both the primary logical storage device and the secondary logical storage device storing the log file of the journaling file system by storing dirtied metadata objects in the cache of the storage processor to a vault area and then applying the stored dirtied metadata objects against the underlying persistent storage.

In particular, the technique increases the availability of the single point of failure (i.e. the log file) in the file system is provided. To guard against the failure of the entire storage device group, a slice from a pool of slices in a secondary storage device group is additionally mapped to provide a second logical persistent storage device such that a write to the log file is not only stored to the first slice containing the log file, but also to a redundant slice on the secondary storage device group. Thus, if the primary storage device group fails, the secondary storage device group still allows the processing of the log file.

If an error occurs on the primary storage device group, the storage processor continues processing of the file system based on the log file stored on the secondary logical storage device group. However, if both the primary logical storage device group and the secondary logical storage device group, the log file cannot be executed.

Thus, upon detection of the failure of both storage device groups, the dirty metadata held in the cache is immediately written to a vault area in the storage processor. It also necessary to stop the processing of file system requests during the reconstruction of the file system, therefore the file system is likewise frozen in place.

The log file is then reconstructed by first allocating a new slice from a storage device group that is in the online state, if one exists, and then by writing the dirty metadata from the vault area to slices of the storage device groups.

Once all the metadata is written to the underlying slices of the storage device groups, the file system should be in a consistent state. Then, the file system can be unfrozen to allow the processing of file system updates.

In another embodiment of the invention, a storage system in which integrity of a single point of failure is preserved is provided. The storage system includes a set of storage device groups including a set of persistent storage modules, the set of storage device groups divided into a pool of slices, the single point of failure being stored on a slice of a pool of slices of a primary storage device group of the set of storage device groups and a storage processor, the storage processor including a cache and controlling circuitry that provides access to elements of the storage system. The controlling circuitry performs recovery of a double failure of the storage device groups containing the log file as in the method described above.

It a further embodiment the method described above is embodied as a computer program stored on a non-transitory storage medium executed by a microprocessor.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique involves a secondary logical persistent storage device for storing a redundant copy of the log file and recovery of the file system from dirtied metadata blocks held in a storage processor cache when both logical persistent storage device have failed.

Figure 1:
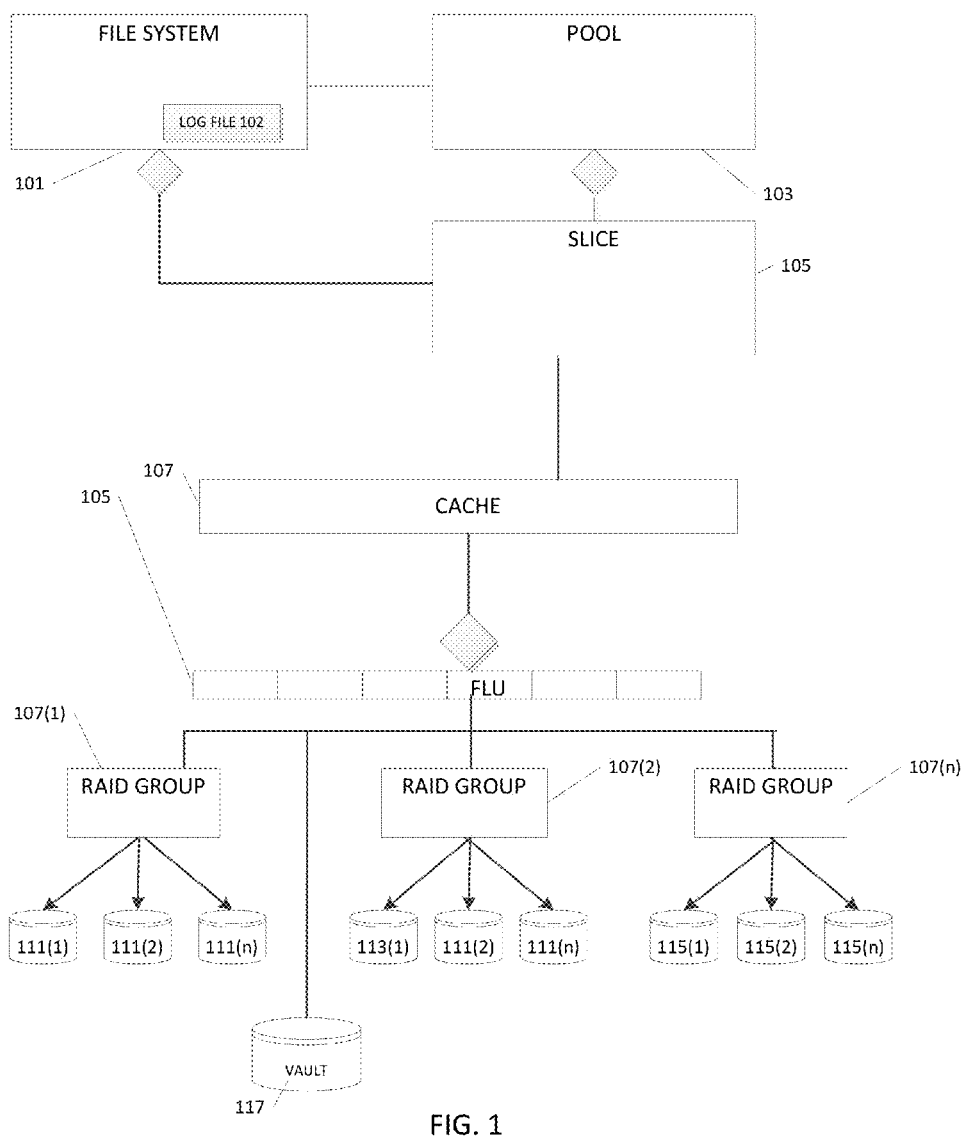
FIG. 1 is a schematic diagram illustrating a storage processor providing redundant storage of a single point of failure and the ability to recovery when the redundant storage is unavailable.

FIG. 1 of illustrates a storage processor 100 with a journaling file system 101 that recovers from faults of multiple storage device groups 107. The file system includes a log file 102 that is stored within a single object within a logical storage unit of the storage processor. The logical storage unit is constructed from sets of storage devices 111(1 . . . n), 113(1 . . . n) and 115(1 . . . n) divided into logical units represented by raid groups or storage device groups 107(1), 107(2) and 107(3) respectively.

Figure 2:
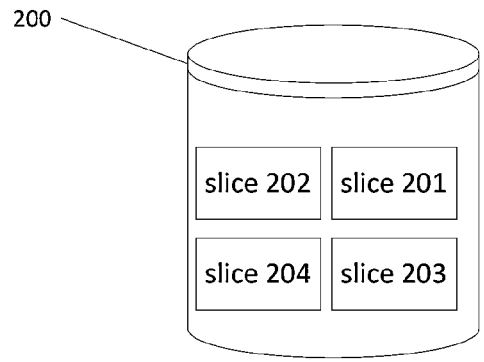
FIG. 2 is a block diagram illustrating the pool of slices available on a persistent storage device.

FIG. 2 is a block diagram illustrating the pool of slices available on persistent storage devices groups 107(1), 107(2) and 107(3). Each logical unit in the storage processor is divided into slices 201-204 in storage device 200, that represent a series of contiguous blocks (not shown) within the logical unit.

The file system 101 (see FIG. 1) holds user data object and metadata objects in the slices 201-204. The file system allocates these user data objects and metadata objects from slices among a pool of slices 103 taken from each storage device group 107. It will be understood that each storage device group 107 contains a pool of slices 201-204 and that the pool of slices 103 is therefore a superset of the pool of slices held in each storage device group 107. Further that the translation from a logical address to physical address for reading slices from the storage device groups is performed by the FLU 105.

Figure 3:
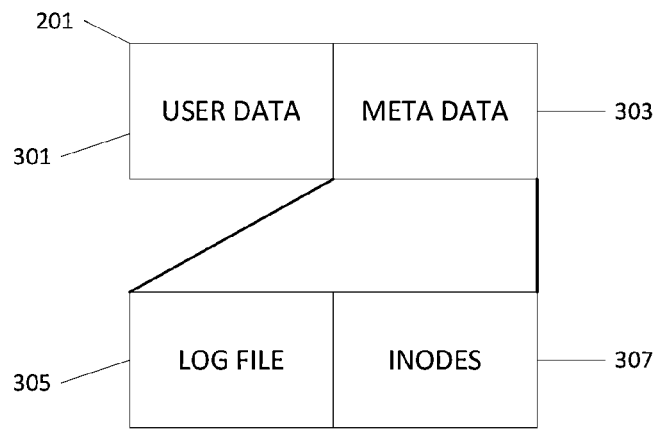
FIG. 3 is a block diagram illustrating a data structure of a slice containing the log file.

FIG. 3 is a block diagram illustrating a data structure of a slice containing the log file. The log file 102 is stored on a slice 201. Thus, slice 201 represents a single point of failure. The slice 201 contains both user data objects 301 and metadata objects 303. The metadata object 303 contains the stored log file 305 and the inodes 307. As the slice 201 contains the log file 102, there is only one logical copy per file system.

Figure 4:
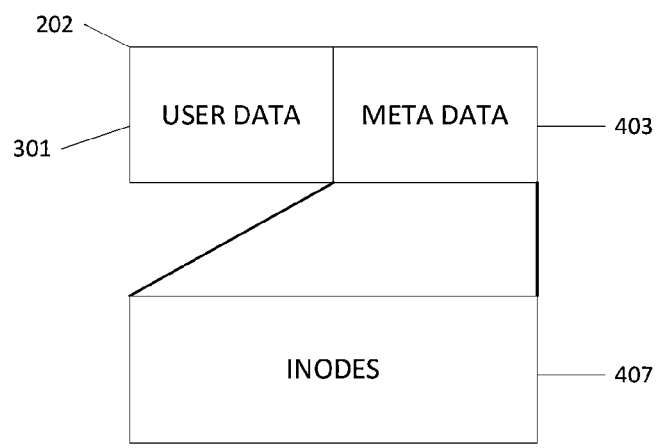
FIG. 4 is a block diagram illustrating a data structure of a slice containing inodes.

FIG. 4 is a block diagram illustrating a data structure of a slice containing inodes. Metadata objects 403 contains the inodes 407 differentiating it from the single point of failure in slice 201. It is understood that all the slices 203-204 would store metadata data as illustrated in slice 202.

As shown above the slice 201 stores the log file 102 in the log file area 305. Conventionally there is only one copy, for example stored in the logical storage device of storage device group 107(1). The storage processor 100 stores a redundant copy of the slice 201 on a second logical storage device, for example storage device group 107(2).

Thus, the second logical device is mapped in such a manner that a write of slice 201 is written to both storage device group 107(1) and storage device group 107(2). Logic within the file system detects the failure of one of the storage device groups, for example, storage device group 107(1) but allows processing of the log file via storage device group 107(2).

The file system further detects failure of both storage device group 107(1) and storage device group 107(2). If each of these storage groups contains the slice 201 storing the log file 102, the storage processor 100 sequentially writes metadata slices that have been updated (i.e. pending a write to persistent storage) in the cache 119 to the vault 117. The vault is realized using the RAID group. The RAID Group is battery backed, sufficient enough to save the cached, in memory dirty objects/data to the associated persistent store.

The file system 101 then allocates a new slice from the pool of slices, in for example, storage device group 107(3). This pool is mapped to receive the writes to slice 201 containing the log file 305 and metadata 307. It is understood that the log file 305 is not a file, but metadata of the file system. It is understood that the log file 305 is not a file, but metadata of the file system.

The log file 102 represents commands for pending writes to the persistent storage of storage device groups 107. As such the metadata slices stored in the vault represent the changes that the log file 102 processes. In other words, the changes may be found in both the log file and the cache.

As such, the file system 101 writes the dirtied metadata slices stored in the vault 119 to each slices target slice on the storage device groups 107. When this transaction is complete, the metadata of the file system 107 should be in a consistent state. The new slice in the storage device group 107(3) is then initialized to normally process file system requests.

If during the recovery operation a further error occurs, for example, because the storage device groups 107(1) and 107(2) are offline, the dirtied metadata slices stored in the vault can be used after the file system 101 to recover the log file by applying the saved metadata objects saved in the vault 117.

Figure 5:
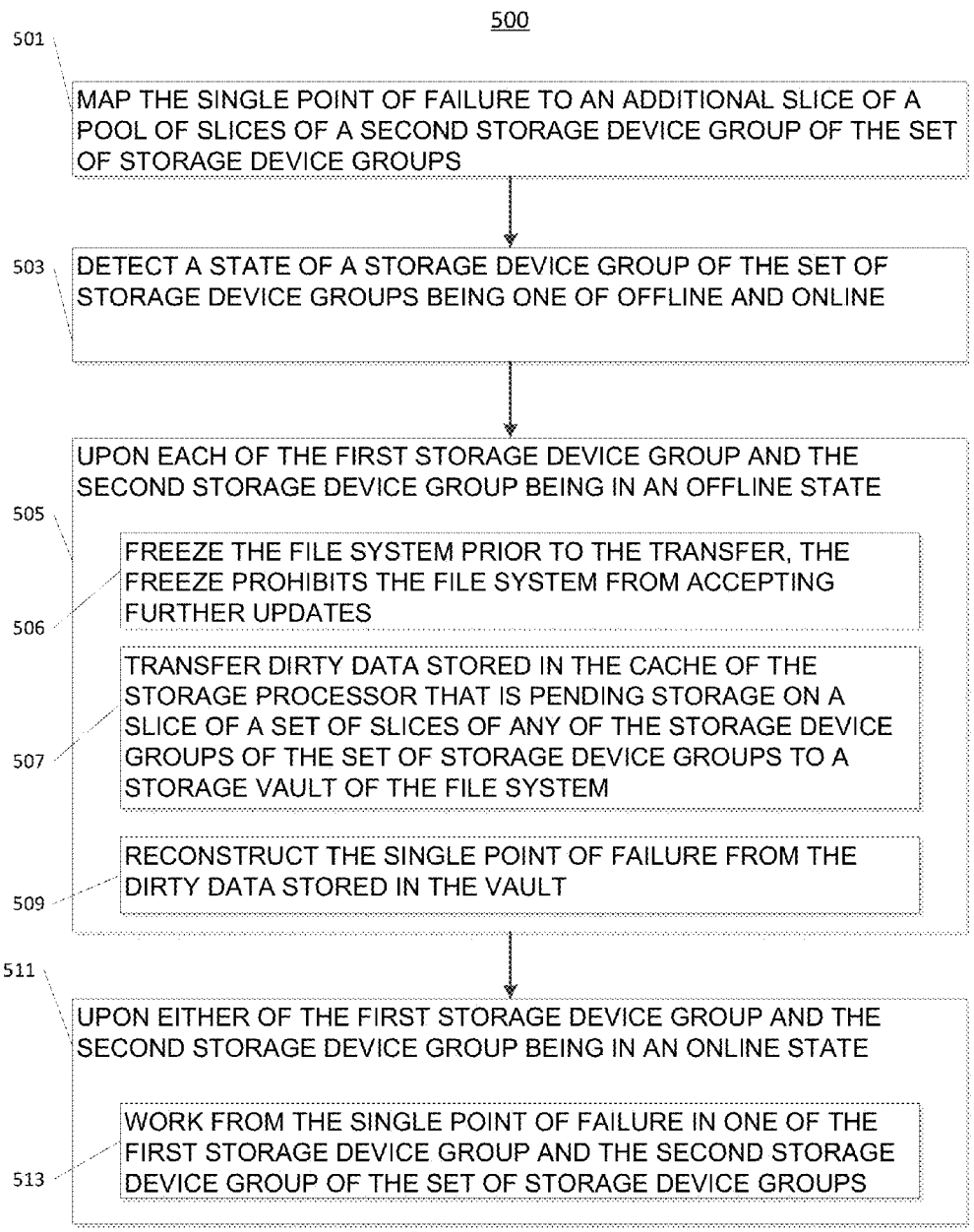
FIG. 5 is a flow chart illustrating the method of providing redundant storage of a single point of failure and the ability to recovery when the redundant storage is unavailable.

FIG. 5 illustrates performing a method 500 of increasing availability of a single point of failure (i.e. log file 102) within a storage system. The first step is to includes configuring a redundant slice for the log file 102, by mapping in step 501, the single point of failure (i.e. file system 102) to an additional slice of a pool of slices of a secondary storage device group 107 (2) of the set of storage device groups 107(1-3). The, in step 503, detect a state of a storage device group of the set of storage device groups 107(1-3) being one of offline and online. Then in step 505, if each of the primary storage device group 107(1) and the secondary storage device group 107(2) are in an offline state, freeze the file system at step 506. Next, at step 507 transfer dirty data stored in the cache 119 of the storage processor 100 to a storage vault 119 of the file system 101, and then at step, 509 reconstruct the single point of failure (i.e. log file 102) from the dirty data stored in the vault 117.

At step 511, if either of the primary storage device group and the secondary storage device group being in an online state, the at step 513 the file system can still function, therefore work from the single point of failure (i.e. log file 102) in one of the primary storage device group 107(1) and the secondary storage device group 107(2) of the set of storage device groups 107(1-3).

Figure 6:
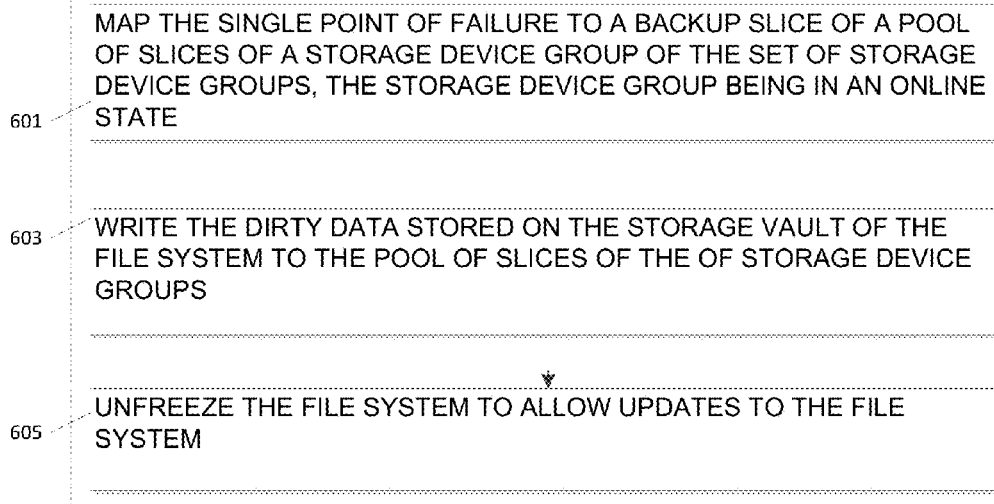
FIG. 6 is a flow chart illustrating the method of recovering a file system online.

FIG. 6 is a flow chart illustrating the method of recovering a file system online. The reconstruction of the single point of failure further performs the step 601 of mapping the single point of failure 102 to a backup slice of a pool of slices of a storage device group 107(3) of the set of storage device groups 107(1-3), the storage device group 107(3) being in an online state. Then, at step 603, write the dirty data stored on the storage vault of the file system to the pool of slices of the of storage device groups. Finally, unfreeze the file system 101 at step 605 to allow updates to the file system 101.

Figure 7:
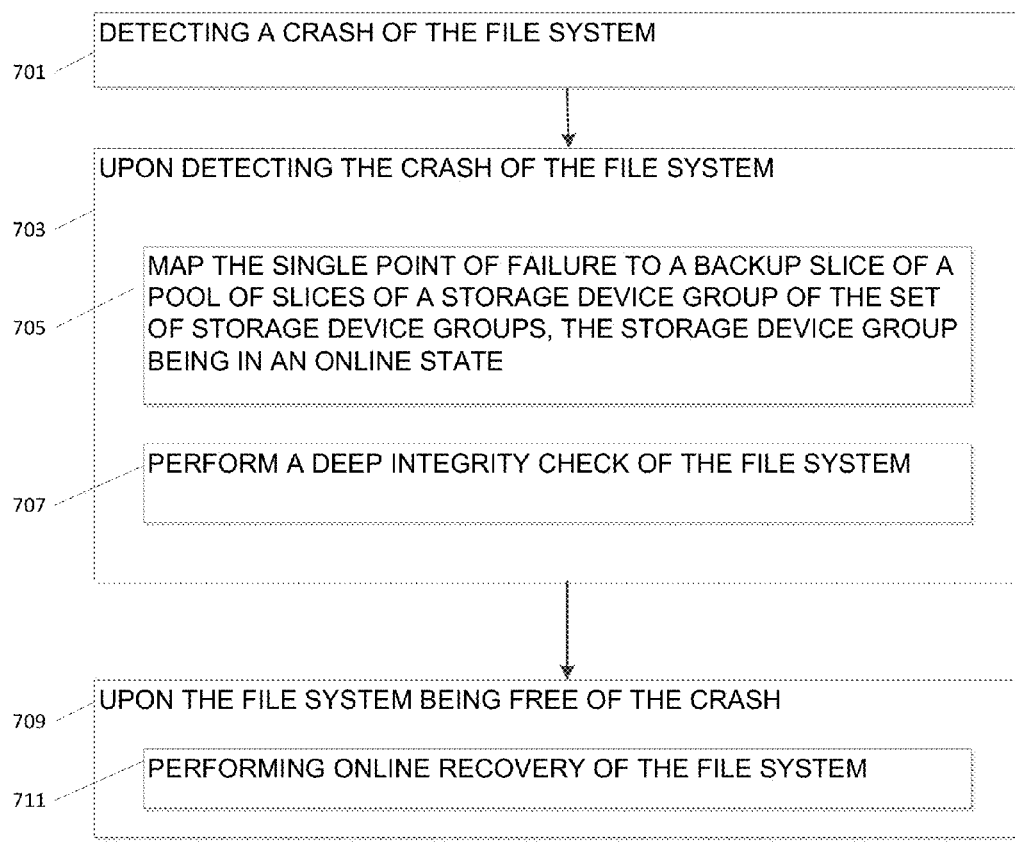
FIG. 7 is a flow chart illustrating the method of recovering a file system when a crash occurs during an attempt to recover the file system online.

FIG. 7 is a flow chart illustrating the method of recovering a file system when a crash occurs during an attempt to recover the file system online. When attempting an online recovery of the file system 101, errors occur. Thus, during the transfer of data in step 507, the method, further detects a crash of the file system 101 in step 701. At step 703, if the file system 101 has crashed, then at step 705, map the single point of failure 102 to a backup slice of a pool of slices of a storage device group 107(3) of the set of storage device groups 107(1-3), the storage device group 107(3) being in an online state. Next, at step 707 perform a deep integrity check of the file system.

However, if the file system 101 does not crash (step 709), perform online recovery (step 506, 507 and 509) of the file system 101.

While various embodiments of the present disclosure have been particularly shown and described, it will be understood by those skilled in the art that various changes in form and details may be made therein without departing from the spirit and scope of the present disclosure as defined by the appended claims.

For example, FIG. 1 describes a storage processor. It would be understood that the storage processor 100 would have logic implemented in controller circuitry or by execution of a program stored on a persistent storage device, such as a disk drive, by a microprocessor to perform the method steps discussed above.

What is claimed is:

1. A method of increasing availability of a single point of failure file within a file system stored within a data storage system that includes a set of storage device groups and a storage processor, the single point of failure file being stored within a slice of a pool of slices of a primary storage device group of the set of storage device groups, the storage processor having a cache, the method comprising:
mapping the single point of failure file to an additional slice of a pool of slices of a secondary storage device group of the set of storage device groups;
detecting a state of a storage device group of the set of storage device groups being one of offline and online;
upon each of the primary storage device group and the secondary storage device group being in an offline state:
transferring dirty data stored in the cache of the storage processor that is pending storage on a slice of a set of slices of any of the storage device groups of the set of storage device groups to a storage vault of the file system, and
reconstructing the single point of failure file from the dirty data stored in the vault;
upon either of the primary storage device group and the secondary storage device group being in an online state:
working from the single point of failure file in one of the primary storage device group and the secondary storage device group of the set of storage device groups.

2. The method of claim 1, wherein reconstructing the single point of failure file includes:
creating a new single point of failure file in a backup slice of another pool of slices of another storage device group of the set of storage device groups, the other storage device group being in an online state;
writing the dirty data stored in the storage vault of the file system to the pool of slices.

3. The method of claim 2, further comprising:
unfreezing the file system to allow updates to the file system.

4. The method of claim 2, wherein creating the single point of failure file in the backup slice includes processing file system updates where the updates do not rely on data structures in the backup slice.

5. The method of claim 1, wherein transferring the dirty data includes:
freezing the file system prior to the transfer, the freezing prohibiting the file system from accepting further updates to the file system.

6. The method of claim 1, wherein transferring the dirty data includes:
detecting a crash of the file system;
upon detecting the crash of the file system:
creating a new single point of failure file in a backup slice of another pool of slices of another storage device group of the set of storage device groups, the other storage device group being in an online state;
performing a deep integrity check of the file system; and
upon the file system being free of the crash:
performing online recovery of the file system.

7. The method of claim 1, wherein the single point of failure file includes a log file of the file system and metadata of the file system.

8. The method of claim 1, wherein storage devices of each of the primary storage device group and the secondary storage device group are storage devices of a RAID group having a battery backup; and
wherein transferring the dirty data includes providing enough battery power in each battery backup to effect the transfer of the dirty data.

9. A data storage system storing a file system in which integrity of a single point of failure file of the file system is preserved, the data storage system comprising:
a set of storage device groups including a set of persistent storage modules, the set of storage device groups divided into a pool of slices, the single point of failure file being stored on a slice of a pool of slices of a primary storage device group of the set of storage device groups;
a storage processor, the storage processor including a cache and controlling circuitry that provides access to elements of the file system, the controlling circuitry constructed and configured to:
map the single point of failure file to an additional slice of a pool of slices of a secondary storage device group of the set of storage device groups;
detect a state of a storage device group of the set of storage device groups being one of offline and online;
upon each of the primary storage device group and the secondary storage device group being in an offline state:
transfer dirty data stored in the cache of the storage processor that is pending storage on a slice of a set of slices of any of the storage device groups of the set of storage device groups to a storage vault of the file system, and
reconstruct the single point of failure file from the dirty data stored in the vault;
upon either of the primary storage device group and the secondary storage device group being in an online state:
work from the single point of failure file in one of the primary storage device group and the secondary storage device group of the set of storage device groups.

10. The system of claim 9, wherein the controlling circuitry constructed and configured to reconstruct the single point of failure is further constructed and configured to:
create a new single point of failure in a backup slice of another pool of slices of another storage device group of the set of storage device groups, the other storage device group being in an online state;
write the dirty data stored in the storage vault of the file system to the pool of slices.

11. The system of claim 10, wherein the controlling circuitry is further constructed and configured to:
unfreeze the file system to allow updates to the file system.

12. The system of claim 9, wherein the controlling circuitry constructed and configured to transfer dirty data is further constructed and configured to:
freeze the file system prior to the transfer, the freeze prohibiting the file system from accepting further updates.

13. The system of claim 12, wherein the controlling circuitry constructed and configured to create the single point of failure file in the backup slice is further constructed and configured to process file system updates where the updates do not rely on data structures in the backup slice.

14. The system of claim 9, wherein the controlling circuitry constructed and configured to transfer the dirty data is further constructed and configured to:
detect a crash of the file system;

upon detecting the crash of the file system:
create a new single point of failure file in a backup slice of another pool of slices of another storage device group of the set of storage device groups, the other storage device group being in an online state;
perform a deep integrity check of the file system; and
upon the file system being free of the crash:
perform online recovery of the file system.

15. The system claim 9, wherein the single point of failure file includes a log file of the file system and metadata of the file system.

16. A non-transitory computer readable storage medium with a computer program stored thereon, the computer program executed by a processor to perform a method of increasing availability of a single point of failure file within a file system stored within a data storage system that includes a set of storage device groups and a storage processor, the single point of failure file being stored a slice of a pool of slices of a primary storage device group of the set of storage device groups, the storage processor having a cache, the method comprising:
mapping the single point of failure file to an additional slice of a pool of slices of a secondary storage device group of the set of storage device groups;
detecting a state of a storage device group of the set of storage device groups being one of offline and online;
upon each of the primary storage device group and the secondary storage device group being in an offline state:
transferring dirty data stored in the cache of the storage processor that is pending storage on a slice of a set of slices of any of the storage device groups of the set of storage device groups to a storage vault of the file system, and
reconstructing the single point of failure file from the dirty data stored in the vault;
upon either of the primary storage device group and the secondary storage device group being in an online state:
working from the single point of failure file in one of the primary storage device group and the secondary storage device group of the set of storage device groups.

17. The non-transitory computer readable storage medium of claim 16, wherein reconstructing the single point of failure file includes:
creating a new single point of failure file in a backup slice of another pool of slices of another storage device group of the set of storage device groups, the other storage device group being in an online state;
writing the dirty data stored in the storage vault of the file system to the pool of slices.

18. The non-transitory computer readable storage medium of claim 17, wherein the method further comprises:
unfreezing the file system to allow updates to the file system.

19. The non-transitory computer readable storage medium of claim 17, wherein creating the single point of failure file in the backup slice includes processing file system updates where the updates do not rely on data structures in the backup slice.

20. The non-transitory computer readable storage medium of claim 16, wherein transferring the dirty data includes:
freezing the file system prior to the transfer, the freezing prohibiting the file system from accepting further updates to the file system.

21. The non-transitory computer readable storage medium of claim 16, wherein transferring the dirty data includes:
detecting a crash of the file system;
upon detecting the crash of the file system:
creating a new single point of failure file in a backup slice of another pool of slices of another storage device group of the set of storage device groups, the other storage device group being in an online state;
performing a deep integrity check of the file system; and
upon the file system being free of the crash:
performing online recovery of the file system.

\* \* \* \* \*